United States Patent [19]
Brammer

[11] 3,884,450
[45] May 20, 1975

[54] GROUND ANCHOR FOR MOBILE HOMES AND THE LIKE

[76] Inventor: Robert C. Brammer, 336 W. Seventh St., Traverse City, Mich. 49684

[22] Filed: Jan. 2, 1974

[21] Appl. No.: 429,814

[52] U.S. Cl. ............... 254/164; 24/269; 248/361 A
[51] Int. Cl. ...................... A63b 61/04; B65d 63/00
[58] Field of Search ...................... 254/161, 164, 51; 248/361 A; 280/179 A; 105/368 T; 24/68 R, 68 CD, 68 D, 269; 16/168, 169

[56] References Cited
UNITED STATES PATENTS

| | | | |
|---|---|---|---|
| 472,927 | 4/1892 | Kidd | 254/161 |
| 1,292,801 | 1/1919 | Keogh | 16/169 |
| 1,433,379 | 10/1922 | Kiesel | 16/168 |
| 2,635,828 | 4/1953 | Lacy | 254/161 |
| 2,671,937 | 3/1954 | Finke | 24/269 |
| 3,754,733 | 8/1973 | Foster | 24/269 X |

*Primary Examiner*—Al Lawrence Smith
*Assistant Examiner*—Robert C. Watson
*Attorney, Agent, or Firm*—Price, Heneveld, Huizenga & Cooper

[57] ABSTRACT

A tensioning device especially useful for tightening and securing tie-down straps, cables, or the like for mobile homes and other trailers or vehicles. The device includes a bracket anchored to the ground and at least one resiliently compressible, rotatable, axially movable tensioning member mounted therein. Means are included in a first axial position of the member to allow rotation of the member for winding a strap or cable and to limit axial movement during such rotation. Separate means are provided to lock the member against rotation in a second axial position thereof.

27 Claims, 8 Drawing Figures

GROUND ANCHOR FOR MOBILE HOMES AND THE LIKE

This invention relates to anchoring devices for tying down mobile homes and other vehicles and, more particularly, to an anchoring device including a tensioning member which may be located to wind and tighten a strap or cable and lock to secure that strap or cable in its tightened condition.

BACKGROUND OF THE INVENTION

Mobile homes and other trailers and vehicles are often secured with tie-down straps or cables to prevent them from being blown over or capsized by strong winds. Typically, such straps or cables extend over the top of the mobile home or trailer in one or more locations along the length thereof and are secured to the ground adjacent the sides of the trailer.

In the past, many devices have been devised for tightening and securing these straps or cables. Generally, these prior devices have included many cooperating parts designed to allow the device to be used both to tighten the strap or cable and to secure it as tightened. A common feature has been to provide a bolt or shaft extending between the sides of a bracket. The shaft typically includes thread to which a nut is secured for tightening after the strap or cable has been wound sufficiently. A square shoulder on the shaft or bolt has been used to mate with a square aperture in the bracket to secure the shaft against rotation after tightening. See, for example, U.S. Pat. No. 3,416,763 issued on Dec. 17, 1968, and entitled DEVICE FOR TENSIONING STRAPS, WIRES, OR LIKE FLEXIBLE ELEMENTS.

Another prior known device is illustrated in U.S. Pat. No. 3,673,432 issued on July 4, 1972, to E. W. Harwell and entitled TENSION DEVICE FOR WIRES, STRAPS, AND THE LIKE. This device includes a threaded shaft of the type mentioned above as well as a hook-shaped head on one end which engages the side of the bracket after the strap has been tightened.

Yet another prior known device is illustrated in U.S. Pat. No. 3,638,912 issued on Feb. 1, 1972, to A. M. Moreno and entitled TENSIONING DEVICE FOR GUY WIRES. This device includes a threaded shaft having a clamping device incorporated thereon for securing a tensioning cable to the shaft.

All of these prior known devices have required substantial time to tighten the nut on the threaded shaft to secure the shaft in its tightened position. If the nut is at all rusty or otherwise hard to turn, such tightening can be very difficult.

An associated drawback with these prior devices is that during rotation of their shafts, there is the substantial possibility that the square shoulders designed to prevent rotation of the shaft can be engaged through inadvertent axial displacement of the shaft. Again, this causes great inconvenience for the operator. Also, none of the prior known devices have enabled the tensioning or securing of more than one strap or cable using the same device thus necessitating the use of a plurality of separate devices individually secured to the ground. Additionally, the prior devices have been very expensive to manufacture because of all the necessary threading, milling, drilling, and cutting operations which must be performed on the shafts.

SUMMARY OF THE INVENTION

Accordingly, it is the purpose of the present invention to provide a tensioning device especially adapted for tightening and securing tie-down straps, cables, or the like for mobile homes, trailers, and other vehicles. The present apparatus allows rapid and unobstructed rotation of a tensioning member to tighten a strap or cable and yet allows extremely rapid, simple, and effective locking of the tensioning member when sufficient tension has been placed on the strap or cable. The invention allows rotation of a tensioning member for winding and tensioning either a strap or cable while axial displacement in either axial direction is limited and resisted during such rotation. Additionally, the device provides for rapid axial displacement of the tensioning member to lock the member against rotation once proper tension on the strap or cable has been achieved.

The invention includes a supporting bracket having upstanding flanges with aligned apertures therein for receiving an elongated, resilient, tubular tensioning member. The tensioning member is mounted for axial and rotational movement in the flange apertures. Rounded nubs or protrusions are provided at one end of the member for limiting axial movement of the member in either direction but allowing rotation to wind the strap or cable. An axial slot and an aperture, through the side wall of the tubular member, provide means for securing either a strap or cable to the member. Additionally, the axial slot provides a space allowing the resilient flexing and circumferential compression of the tubular member such that the rounded protrusions which limit the axial movement during rotation may be forced through the flange apertures when the member is slid into its locked position.

Outwardly extending projections or keys are spaced about the circumference of the tubular member at least at one end thereof for cooperation with corresponding keyways about the flange aperture periphery to provide means for locking the tubular member against rotation when it is slid axially against a projecting abutment formed on one end of the member.

Accordingly, the present anchoring device enables the quick and convenient wrapping of a strap or cable about the rotatably mounted tensioning member while means prevent the axial movement of the member during such rotation. When the correct tension has been achieved on the strap or cable, the locking projections are aligned with and moved axially into the corresponding keyways to lock the device. The same means which limit the axial movement in the rotational operation of the device also prevent the member from becoming unlocked inadvertently after tensioning is achieved.

An associated advantage is the reduction in cost for producing this invention. The tubular tensioning member can be quickly, easily, and inexpensively formed by stamping a planar sheet of metallic material with all the necessary apertures, abutments, protrusions, and projections after which it is roll formed into an axially slotted tube. Time-consuming and costly machining operations are thereby obviated.

These and other objects, features, advantages, and purposes of the invention will become more apparent from a study of the following description taken in conjunction with the drawings.

DESCRIPTION OF THE PREFERRED EMBODIMENT

Figure 1:
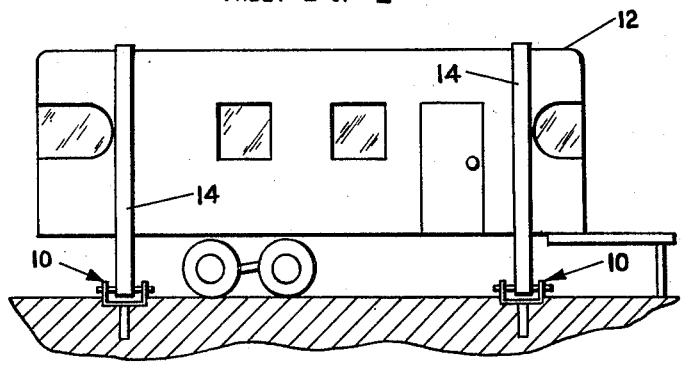
FIGS. 1 and 1A are side and end elevations of a typical mobile home secured with tie-down straps anchored to the ground with the tensioning device of the present invention.
Figures 1A, 2:
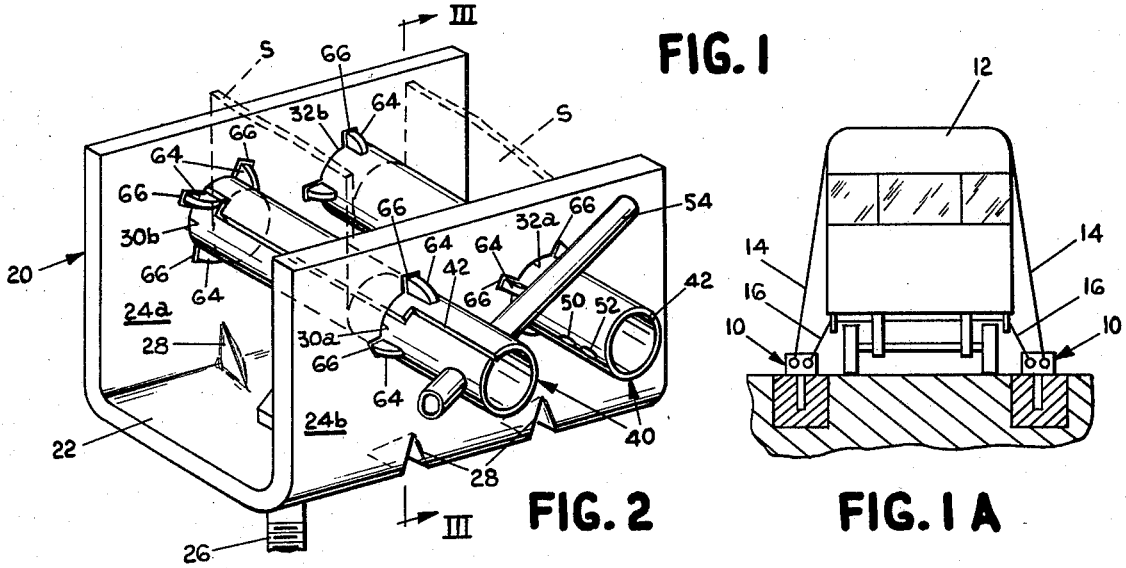
FIG. 2 is a perspective view of the tensioning device of the present invention with the tensioning members shown in their locked positions.

Referring now to the drawings in greater detail, FIGS. 1 and 1A illustrate the present tensioning apparatus 10 for anchoring a mobile home 12 or similar trailer or vehicle to the ground. Tie-down straps or cables are positioned over the top of the trailer as at 14 and through the end frame members beneath the trailer as at 16. Using the present invention, the straps or cables 14 and 16 are secured to tensioning devices 10 on either side of the trailer and at various positions therealong to apply the proper tension to the straps or cables to retain the trailer securely on the ground and to counteract strong winds or the like. The tensioning device 10 may be secured by concrete blocks, augers, or other stabilizing members 17 in the ground adjacent the sides of the trailer as illustrated.

As shown in FIGS. 2–5, each of the tensioning devices 10 includes a generally U-shaped support bracket 20 and a pair of elongated, resilient, cylindrical, tubular tensioning members 40. Individual straps or cables 14 and 16 are secured to either one or both of tensioning members 40 which may be rotated in one position to wrap the strap or cable therearound to provide the desired tension on the strap or cable. Thereafter, the tubular members 40 are slid axially to lock and prevent rotational movement thereby maintaining the proper tension on the strap or cable.

The U-shaped support bracket 20 includes a base 22 and upstanding, generally parallel flanges 24a and 24b formed integrally along opposing edges thereof. In the preferred embodiment, two threaded securing bolts 26 or other securing means extend downwardly through suitable apertures in the base 22 for anchoring the tensioning device 10 to a suitable stabilizing member such as a concrete block, steel support, or the like buried in the ground adjacent a trailer (see FIG. 1A). The support bracket also includes reinforcing detents or gussets 28 stamped into the corners where the flanges 24 and base 22 meet in order to make the flanges resistant to bending forces. Flanges 24 also include two sets of opposing, aligned apertures 30a and 30b and 32a and 32b, respectively, which receive the tubular tensioning members therethrough. Apertures 30a and 30b and 32a and 32b are circular and have a diameter very slightly larger than the normal, uncompressed diameter of the tubular tensioning members 40.

As is best seen in FIGS. 3–5 and 7, each of the tensioning members 40 is a cylindrical tube including opposing ends 41 and 43 and an axial slot 42 extending along the entire length of its side wall. Slot 42 includes an intermediate section 44 which is formed by a tongue 45 and corresponding recess 47 in the tube wall. Section 44 is offset circumferentially from the remainder of the slot and joined thereto by circumferentially extending portions 46. The tongue 45 and recess 47 limit torsional and longitudinal deformation of the tubular member. The intermediate portion 44 is also offset toward end 41 and away from end 43. This axial offset enables the end of a tie-down strap, such as that shown at S in FIGS. 2, 3, and 4, to be inserted into and secured in the slot when the tensioning member 40 is in its rotational position while assuming that the tensioning member can be moved axially to its locked position once proper tension has been achieved.

Figure 3:
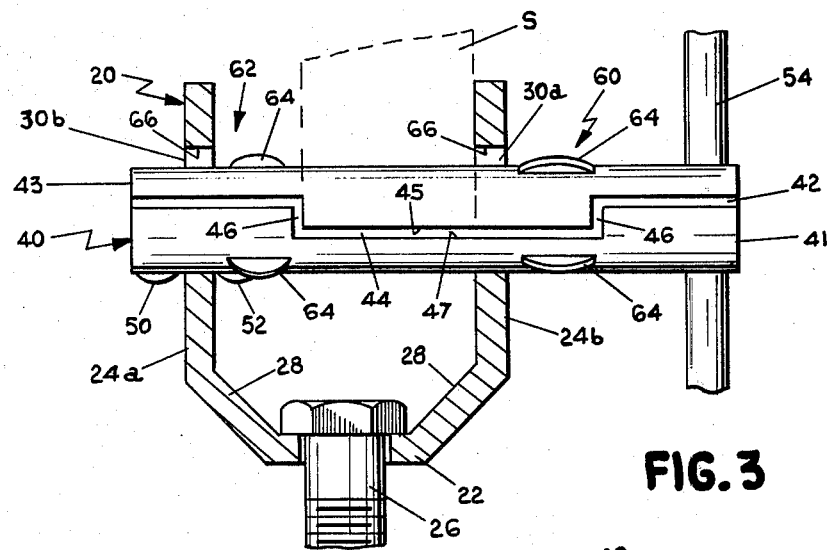
FIG. 3 is a sectional, end elevation of the tensioning device taken along plane III—III of FIG. 2, the tubular tensioning member being shown in its rotational position.
Figure 7:
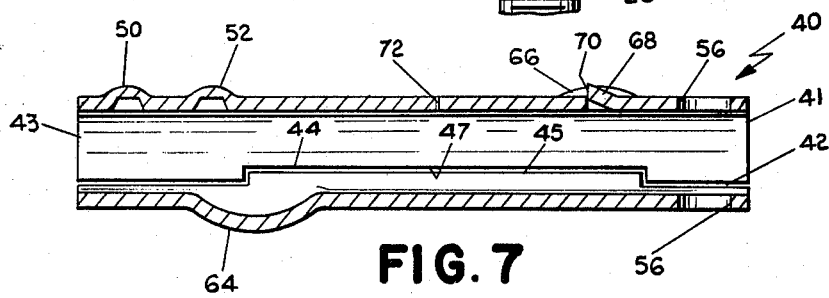
FIG. 7 is a sectional side view of the tubular tensioning member.

The tubular member 40 also includes rounded, partially spherical protrusions on nubs 50 and 52 which are located adjacent end 43 of the member 40. These nubs are spaced apart generally axially and parallel to the longitudinal axis of the tubular member. The axial distance between the nubs is slightly greater than the thickness of the flanges 24 as is best seen in FIG. 3. When the tubular member 40 is inserted partially into the bracket 20 through apertures 30 and 32 such that one protrusion 50 is on the exterior of one flange and the remaining protrusion 52 is on the interior of that same flange, the tubular member 40 may be rotated via a bar or rod-type wrench 54 inserted through diametrically aligned apertures 56 adjacent end 41 of the cylindrical tube to wind the strap S or tensioning cable about the tube.

The tubular member 40 is also provided with sets 60 and 62 of radially extending projections or keys 64. In the preferred embodiment, three of the projections or keys are included in each of the sets 60 and 62. Projections 64 are preferably spaced equally about the circular circumference of the tube 40 and are also rounded generally in the axially extending direction. The centers of the projections in sets 60 and 62 are spaced apart a distance equal to the distance between the centers of flanges 22. They are also offset toward end 41 such that protrusion 52 will be adjacent the exterior of one of the flanges when the tube is locked against rotation.

Figure 5:
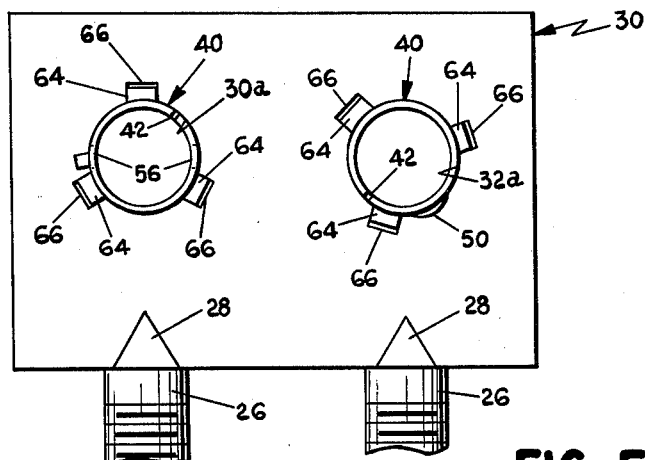
FIG. 5 is a side elevation of the tensioning device shown in FIGS. 2–4.

Cooperating with keys 64 are cutout portions or keyways 66 provided about the periphery of flange apertures 30 and 32 (FIGS. 3 and 5). Cutouts or keyways 66 are spaced equally around the circular apertures 30 and 32 and are slightly deeper than the distance projections 64 extend beyond the exterior surface of tubular member 40. The respective projections or keys in sets 60 and 62 and the cutout areas or keyways 66 corresponding thereto may, but need not, be axially aligned along the tubular member. Thus, for ease of manufacture, the various keys 64 in one of the sets 60 or 62 may be either axially aligned with or circumferentially offset from their counterparts in the other set.

Figure 4:
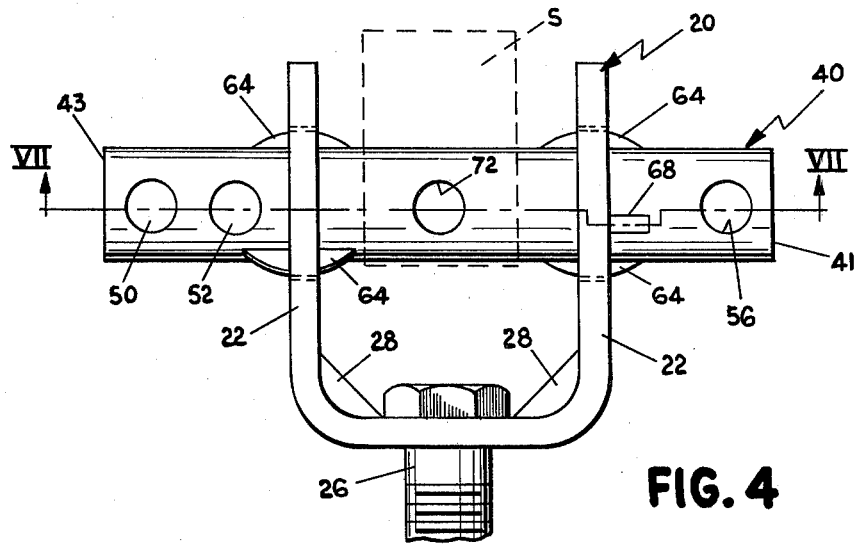
FIG. 4 is an end elevation of the tension device shown in FIGS. 2 and 3 with the tubular tensioning member shown in its locked position.

A projecting abutment 68 having an abutment face 70 extending transverse to the longitudinal axis of the tubular member is lanced in the wall of the tubular member between two of the projections 64 in set 60. Abutment 68 is therefore positioned at the tube end opposite the end including nubs 50 and 52 and serves to limit the axial movement of the tubular member when it is moved axially to its locked position. As shown in FIG. 3, wherein the tubular member is in its rotational position, protrusions 50 and 52 limit axial movement of the tubular member in either axial direction. The locking projections or keys 64 are spaced axially from the cutout portions or keyways 66 in this position and therefore do not resist rotation of the tubular member. When the strap or cable has been wound sufficiently tightly on the tubular member, the projections 64 are aligned with the cutouts 66 and the member is driven or hammered axially further through the apertures 30 or 32 such that nub 52 passes to the exterior of flange 24a (FIG. 3) and abutment 68 engages the exterior of flange 24b (FIG. 3). During this movement, keys 64 are engaged by the keyways 66 and rotational movement of the member is thereafter resisted holding the strap or cable in proper tension. When the tubular member has been moved to its locked position as described above, the tensioned strap or cable is also centered between the flanges 22 as shown in FIGS. 4 and 6.

An advertent axial movement of the members 40 in the locked position is resisted by nub 52 and abutment 68 insuring that the keys will remain in engagement with the keyways and that the unit will remain tensioned until members 40 are purposely returned to the rotatable position. Such return can be accomplished by hammering end 43 to shift the members to the left as viewed in FIG. 3, nub 52 passing through aperture 30b in the manner described previously.

Figure 6:
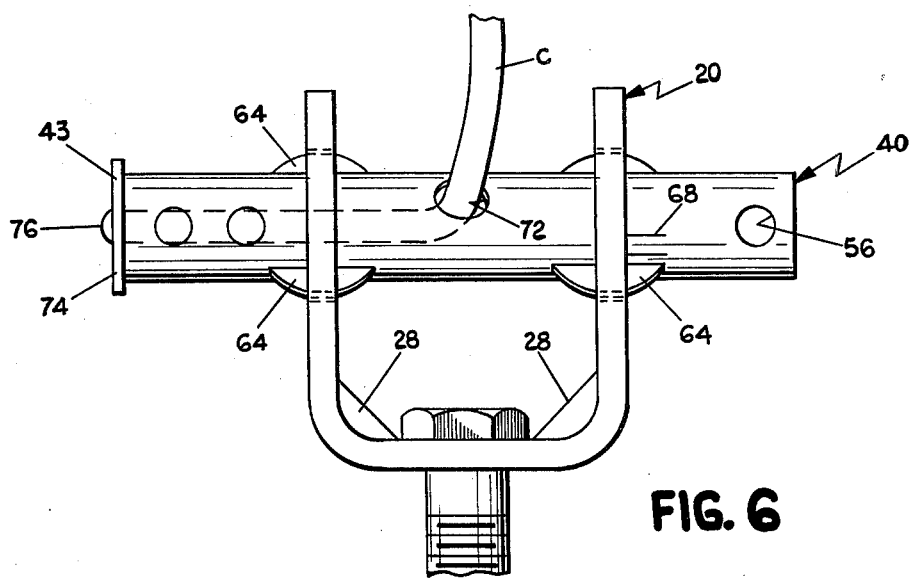
FIG. 6 is an end elevation of the tensioning device shown securing a tie-down cable.

As shown in FIG. 6, an aperture 72 is provided through the wall of the tube 40 for the insertion of the end of a tie-down cable if such is used. The cable C is inserted through aperture 72 and bent to extend through the interior of the tube 40 such that it exits at end 43. A cap, such as a washer 74 having a cross-sectional area larger than that of the tube 40 and a central aperture therein, is fitted over or against the end 43 of tube 40 with the cable being knotted or otherwise secured as at 76. Accordingly, cable C is securely fastened to the tubular member and may be wound to produce the proper tension thereon as desired.

Both the bracket 20 and the tubular member 40 are preferably stamped and formed from sheet or plate metal. The tubular member is preferably embossed in planar form with tongue and recesses 45 and 47, nubs 50 and 52, apertures 56 and 72, keys 64 and abutment 68 all being punched or embossed therein. Thereafter, the sheet with the formed embossments and apertures in their correct positions is roll formed into a tube such that tongue 45 extends into recess 47 and the other protrusions and projections are properly aligned. The entire member 40 can be inexpensively formed through a progressive die arrangement.

An important aspect of this invention is the use of materials for the tubular member 40 having sufficient resiliency to give it a spring-like quality. Such resiliency and the space provided by the slot 42 allow the tubular member to be resiliently flexed and compressed circumferentially thereby reducing the circumferential dimension and diameter of the tube by the camming action of the rounded nubs 50 and 52 against the edges of apertures 30 or 32. Accordingly, when the tubular member is forced through apertures 30 or 32, the tensioning member is compressed to allow the nubs to pass through the apertures after which the member resiliently expands to its original dimensions. For best results, it has been found that the slots 42 should be at least as wide as the distance nubs 50 and 52 extend above the normal exterior surface of the cylindrical tube.

Although the preferred embodiment of this device includes a pair of tubular tensioning members 40 inserted through flanges 22 in bracket 20, the scope of the present invention also includes the use of a single tubular member as well as three or more tubular members inserted through opposing flanges in the same bracket. Accordingly, one, two, three, or more tiedown straps or cables may be secured with the same tensioning device and still be within the scope of the present invention. Additionally, the preferred embodiment has been shown with two sets of locking keys 64, one set adjacent either end. However, this invention may also be used with only one set of such keys adjacent either end of the tube.

Each strap or cable may be individually secured to a single tubular tensioning member which has been inserted to a first axial position in bracket 20 such that nubs 50 and 52 limit axial movement of the member in either axial direction but allow rotational movement of the member. After the strap or cable has been sufficiently tensioned by winding on the central portion of the tube between the bracket flanges, the keys 64 may be aligned with their corresponding keyways in the flange apertures and the tubular member driven further through the flanges. Nub 52 is cammed through the flange aperture and keys 64 mate with cutouts 66 to lock the member against rotational movement. In the locked position, nub 52 resists axial movement of the member back through the flanges and prevents the tubular member from becoming unlocked. Further axial movement of the member through the flanges is prevented in the opposite direction by abutment 68.

Thus, the tensioning and locking of the strap or cable is accomplished by a tubular member which includes no nuts, threads or any other loose parts which must be accounted for before operation of the device. A single tubular member with its integrally formed apertures and embossments and a bar-type wrench inserted therethrough provide all the necessary rotational and locking means required for the proper tensioning of tiedown straps.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. Apparatus for tensioning straps, cables, and the like comprising a support bracket having upstanding flanges, each flange having opposite side surfaces, aligned apertures in said flanges, and means for anchoring said support bracket to the ground; an elongated, resilient, tubular tensioning member extending between said flanges; means for mounting said tensioning member for rotational and axial movement in said apertures for winding a strap, cable or the like thereon and locking the strap, cable, or the like as wound; slot means extending along the side wall of said member for receiving a strap, cable, or the like, said slot means and the resiliency of said tubular member allowing said tubular member to be circumferentially compressed; and means for circumferentially compressing said tubular member when said member is moved axially in said apertures including a rounded protrusion at one end of said member for resisting axial movement of said member, said protrusion normally extending into abutment with one of said opposite side surfaces of one of said flanges at the edge of one of said apertures whereby, as said member is moved axially, said protrusion compresses said member to allow said protrusion to pass through said apertures for abutment with another of said opposite side surfaces of one of said flanges.

2. The tensioning apparatus of claim 1 wherein said slot means has a width at least as wide as the distance said protrusion extends beyond the surface of said tubular tensioning member.

3. The tensioning apparatus of claim 1 wherein each of said flanges has a predetermined thickness, said tensioning member including first and second rounded protrusions adjacent said one end of said member, said projections being spaced axially apart parallel to the longitudinal axis of said member a distance slightly greater than said flange thickness.

4. The tensioning apparatus of claim 3 wherein said bracket includes two flanges; said tensioning member further including a projecting abutment at the end opposite said one end for abutment with one of said flanges whereby further axial movement of said member is prevented after the second of said rounded protrusions has been moved through the aperture in the second of said two flanges.

5. The tensioning apparatus of claim 4 wherein said tensioning member includes locking means for preventing rotation of said member after said second rounded protrusion has been moved through the aperture in the second of said two flanges.

6. Apparatus for tensioning straps, cables, and the like comprising a support bracket having upstanding flanges, aligned apertures in said flanges, and means for anchoring said support bracket to the ground; an elongated, resilient, tubular tensioning member extending between said flanges and mounted for rotational and axial movement in said apertures for winding a strap, cable, or the like thereon and locking the strap, cable, or the like as wound; slot means extending along the side wall of said member and a rounded protrusion at one end of said member for resisting axial movement of said member; said protrusion normally extending into abutment with one of said flanges at the edge of one of said apertures; said axial slot and the resiliency of said tensioning member allowing said protrusion to circumferentially compress said member whereby said protrusion can pass through said apertures as said member is moved axially therethrough; said flanges each having a predetermined thickness, said tensioning member including first and second rounded protrusions adjacent said one end of said member, said projections being spaced axially apart parallel to the longitudinal axis of said member a distance slightly greater than said flange thickness; said bracket including two flanges; said tensioning member further including a projecting abutment at the end opposite said one end for abutment with one of said flanges whereby further axial movement of said member is prevented after the second of said rounded protrusions has been moved through the aperture in the second of said two flanges; said tensioning member including locking means for preventing rotation of said member after said second rounded protrusion has been moved through the aperture in the second of said two flanges; said locking means including at least one set of radially extending projections spaced around the circumference of said member at equal distances from said opposite end of the member; at least one of said apertures in at least one of said flanges including cutout areas in the edges thereof which correspond in size, shape, and location to said projections for receiving said projections and preventing rotation of said member.

7. The tensioning apparatus of claim 6 wherein said locking means include a set of radially extending projections at either end of said member; said apertures in each of said flanges including cutout areas corresponding to at least one set of said projections.

8. The tensioning apparatus of claim 1 including locking means for preventing rotation of said member; said locking means including at least one projection extending beyond the exterior surface of said member; and a cutout area in the edge of at least one of said apertures which corresponds in size, shape, and location to said projection for receiving said projection.

9. Apparatus for tensioning straps, cables, and the like comprising a support bracket having upstanding flanges, aligned apertures in said flanges, and means for anchoring said support bracket to the ground; an elongated, resilient, tubular tensioning member extending between said flanges and mounted for rotational and axial movement in said apertures for winding a strap, cable, or the like thereon and locking the strap, cable, or the like as wound; slot means extending along the side wall of said member and a rounded protrusion at one end of said member for resisting axial movement of said member; said protrusion normally extending into abutment with one of said flanges at the edge of one of said apertures; said axial slot and the resiliency of said tensioning member allowing said protrusion to circumferentially compress said member whereby said protrusion can pass through said apertures as said member is moved axially therethrough; said slot means includes an axial slot extending the entire length of said member; said slot including an intermediate portion offset circumferentially from the remainder thereof.

10. The tensioning apparatus of claim 9 wherein said intermediate portion of said slot is located closer to one end than to the end of said tensioning member.

11. The tensioning apparatus of claim 1 wherein said tensioning member includes means for rotating said member; said rotating means including a pair of diametrically aligned apertures and a wrench received therethrough.

12. The tensioning apparatus of claim 1 wherein said support bracket is generally U-shaped and has two upstanding, parallel flanges and a base connecting one end of each of said flanges; said anchoring means including at least one securing member extending through said base.

13. The tensioning apparatus of claim 1 wherein said flanges include at least two sets of aligned apertures; each of said sets of apertures receiving a tensioning member.

14. Apparatus for tensioning tie-down straps, cables, and like flexible tie-downs to secure mobile homes and similar structures to the ground, said apparatus comprising a support bracket having spaced, upstanding flanges, each of said flanges having an aperture therein, the axes of said apertures being generally aligned; an elongated, hollow, tensioning menber passing through said apertures and spanning the space between said flanges, said member being axially shiftable in said apertures between a first position wherein it is rotatable within said apertures and a second position wherein it is locked against rotation within said apertures; means on said member for receiving said flexible tie-downs so that the same will be wound therearound when said member is rotated while in said first position; means on said member engageable with said flanges for locking said member against rotation when it is in said second position; and means for retaining said member in either of said positions including means for circumferentially compressing said tensioning member as said member is shifted axially through said apertures, said circumferential compression means being overcomeable by forced axial shifting of said member between said positions.

15. The tensioning apparatus of claim 14 wherein said flexible tie-down receiving means on said member include a slot in the side wall thereof, said slot being coextensive with the length of the member.

16. The tensioning apparatus of claim 15 wherein said slot is non-rectilinear in order to maintain alignment of the portions of said member opposing one another across said slot.

17. The tensioning apparatus of claim 14 wherein said tensioning member is resilient, cylindrical tube; said tie-down receiving means including a slot extending axially along the length of said tube through the side wall thereof; said circumferential compression means including a nub on the exterior of said tensioning member; said slot and the resiliency of the tube allow the tube to resiliently flex and compress circumferentially to allow passage of said nut through said apertures.

18. The tensioning apparatus of claim 14 wherein said locking means comprises at least one keyway communicating with one of said apertures and a key on said member engageable by said keyway when said member is in said second position.

19. Apparatus for tensioning tie-down straps, cables, and like flexible tie-downs to secure mobile homes and similar structures to the ground, said apparatus comprising a support bracket having spaced, upstanding flanges, each of said flanges having an aperture therein, the axes of said apertures being generally aligned; an elongated, hollow, tensioning member passing through said apertures and spanning the space between said flanges, said member being axially shiftable in said apertures between a first position wherein it is rotatable within said apertures and a second position wherein it is locked against rotation within said apertures; means on said member for receiving said flexible tie-downs so that the same will be wound therearound when said member rotated while in said first position; means on said member engageable with said flanges for locking said member against rotation when it is in said second position; and means for retaining said member in either of said positions, said last-mentioned means being overcomeable by forced axial shifting of said member between said positions; said locking means including at least one keyway communicating with one of said apertures and a key on said member engageable by said keyway when said member is in said second position; said member being a cylindrical tube; said locking means including a plurality of said keys comprising a set, said keys being spaced equally about the circumference of said tube; said one aperture including a plurality of keyways each engageable by one of said keys.

20. The tensioning apparatus of claim 19 wherein said locking means include a set of said keys at either end of said tube; said apertures in each of said flanges including keyways engageable by said keys in at least one of said sets.

21. The tensioning apparatus of claim 19 wherein said retaining means include an abutment projecting outwardly from the circumference of said tube between two of said plurality of keys.

22. The tensioning apparatus of claim 14 wherein said circumferential compression means include a nub on the exterior of said member.

23. The tensioning apparatus of claim 14 wherein said retaining means include a pair of nubs spaced axially apart parallel to the longitudinal axis of said tensioning member and adjacent said one end of said member; said spaced nubs cooperating to resist axial movement of said member in said first position; one of said nubs resisting axial movement of said member in said second position.

24. The tensioning apparatus of claim 23 wherein said support bracket includes two flanges; said retaining means including an abutment positioned along said member, projecting beyond the external surface of said member, and adapted to engage the side of one of said flanges to prevent axial movement of the member after both of said nubs have been moved through both of said flanges.

25. Apparatus for tensioning tie-down straps, cables, and like flexible tie-downs to secure mobile homes and similar structures to the ground, said apparatus comprising a support bracket having spaced, upstanding flanges, each of said flanges having an aperture therein, the axes of said apertures being generally aligned; an elongated, hollow, tensioning member passing through said apertures and spanning the space between said flanges, said member being axially shiftable in said apertures between a first position wherein it is rotatable within said apertures and a second position wherein it is locked against rotation within said apertures; means on said member for receiving said flexible tie-downs so that the same will be wound therearound when said member is rotated while in said first position; means on said member engageable with said flanges for locking said member against rotation when it is in said position; and means for retaining said member in either of said positions, said last-mentioned means being overcomeable by forced axial shifting of said member between said positions; said tensioning member being a tube; said tie-down receiving means including an aperture extending through the side wall of the tube and cap means engaging one end of the tube whereby a cable may be passed through said aperture and the interior of said tube and secured to said cap means.

26. The tensioning apparatus of claim 14 wherein said tensioning member includes means for rotating said member; said rotating means including a pair of diametrically aligned apertures and a wrench received therethrough.

27. The tensioning apparatus of claim 14 wherein said flanges include at least two sets of axially aligned apertures; each of said sets of apertures receiving a tensioning member.

* * * * *